(12) United States Patent
Kajihara et al.

(10) Patent No.: US 8,534,408 B2
(45) Date of Patent: Sep. 17, 2013

(54) ELECTRICALLY-OPERATED TWO-WHEELED VEHICLE

(75) Inventors: Eisuke Kajihara, Wako (JP); Dai Kataoka, Wako (JP); Jun Adachi, Wako (JP); Junya Ono, Wako (JP); Asuka Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/614,428

(22) Filed: Sep. 13, 2012

(65) Prior Publication Data

US 2013/0081893 A1 Apr. 4, 2013

(30) Foreign Application Priority Data

Sep. 30, 2011 (JP) ................................. 2011-217102

(51) Int. Cl.
*B62D 61/02* (2006.01)
*B62M 6/00* (2010.01)

(52) U.S. Cl.
USPC ........... 180/220; 180/219; 180/221; 180/226; 180/205.1; 180/65.6; 475/5; 475/13; 475/8; 74/665; 74/640

(58) Field of Classification Search
USPC ........... 180/220, 219, 226, 221, 205.1, 206.1, 180/214, 65.1, 65.6; 475/5, 13, 8; 74/665, 74/640
See application file for complete search history.

(56) References Cited

U.S. PATENT DOCUMENTS

| | | | |
|---|---|---|---|
| 7,182,167 B2* | 2/2007 | Sasamoto | 180/219 |
| 7,672,762 B2* | 3/2010 | Matsubara | 701/22 |
| 8,002,062 B2* | 8/2011 | Saitou | 180/68.3 |
| 8,224,514 B2* | 7/2012 | Center et al. | 701/22 |
| 2008/0173484 A1* | 7/2008 | Umemura et al. | 180/65.2 |
| 2009/0223726 A1* | 9/2009 | Jeon et al. | 180/65.25 |
| 2011/0024206 A1* | 2/2011 | Sagara et al. | 180/65.1 |

FOREIGN PATENT DOCUMENTS

JP 2004-147410 5/2004

* cited by examiner

*Primary Examiner* — Tashiana Adams
*Assistant Examiner* — Marlon Arce
(74) *Attorney, Agent, or Firm* — Birch, Stewart, Kolasch & Birch, LLP

(57) ABSTRACT

An electrically-operated two wheeled vehicle provided with a swing unit which pivotally supports a drive wheel WR. The swing unit includes: a first rotary electric machine having a first rotor; a second rotary electric machine having a second rotor; and a planetary gear mechanism which combines a rotational drive force of the first and second rotors to each other and transmits a product of rotational drive forces to a drive wheel WR in a state where a rotational speed is increased. The first and second rotary electric machines are arranged parallel to each other in the longitudinal direction of a vehicle such that an axis Ax2 of the second rotor is positioned in front of an axis Ax1 of the first rotor along the vehicle body. This arrangement prevents a height position of a lower surface of a swing unit from becoming excessively low.

20 Claims, 12 Drawing Sheets

ELECTRICALLY-OPERATED TWO-WHEELED VEHICLE

CROSS-REFERENCE TO RELATED APPLICATION

The present application claims priority under 35 U.S.C. §119 to Japanese Patent Application No. 2011-217102, filed Sep. 30, 2011. The entire contents of the above-identified application is hereby incorporated by reference.

BACKGROUND OF THE INVENTION

1. Field of the Invention

The present invention relates to an electrically-operated two-wheeled vehicle provided with a first rotary electric machine and a second rotary electric machine.

2. Description of Background Art

Recently, there has been developed an electrically-operated two-wheeled vehicle provided with a swing unit which pivotally supports a rear wheel constituting a drive wheel in a state where the swing unit is mounted on a vehicle body. A rotary electric machine which is a drive source of the electrically-operated two-wheeled vehicle is mounted on this kind of swing unit.

In making use of a rotary electric machine as a drive source, an output of the rotary electric machine is determined based on a required drive force. When a required value is large, a method which increases a size of one rotary electric machine and a method which combines a plurality of rotary electric machines are considered. As a vehicle which adopts a latter method, for example, there has been proposed a hybrid vehicle which includes a so-called multi-layered coaxial rotary electric machine where a first rotary electric machine and a second rotary electric machine are arranged coaxially (see JP-A-2004-147410, for example).

This multi-layered coaxial rotary electric machine is configured such that the second rotary electric machine is arranged radially outside the first rotary electric machine so as to surround the first rotary electric machine. Due to such a constitution, a width size of the first rotary electric machine in the axial direction can be shortened.

In an electrically-operated two-wheeled vehicle, to achieve a wide operation region, it may be possible to arrange a plurality of rotary electric machines described above, for example. However, when the plurality of rotary electric machines are simply arranged parallel to each other along the vehicle widthwise direction, there arises a drawback that a thickness of a swing unit becomes large and hence, the center of weight of a vehicle is offset to the outside in the vehicle widthwise direction.

In view of the above-mentioned drawback, it may be possible to provide the above-mentioned multi-layered coaxial rotary electric machine in the swing unit. In this case, however, a diameter of the second rotary electric machine which is positioned outside the first rotary electric machine becomes large and hence, when a diameter of a rear wheel is small as in the case of a scooter-type electrically-operated two-wheeled vehicle, a height position of a lower surface of the swing unit becomes excessively low whereby there arises a drawback that a possibility that the swing unit is brought into contact with a ground surface (road surface) is increased.

SUMMARY AND OBJECTS OF THE INVENTION

The present invention has been made in view of these drawbacks, and it is an object of the present invention to provide an electrically-operated two-wheeled vehicle which can prevent a height position of a lower surface of a swing unit from becoming excessively low even when two rotary electric machines are arranged in the swing unit, can make the swing unit thin, and can cope with a wide operation region.

According to an embodiment of the present invention, an electrically-operated two-wheeled vehicle (10) provided with a swing unit (12) which pivotally supports a drive wheel (WR) in a state where the swing unit (12) is mounted on a vehicle body. The swing unit (12) includes: a first rotary electric machine (24) which is capable of rotating a first shaft (26); a second rotary electric machine (64) which is capable of rotating a second shaft (66) in both normal and reverse directions; a planetary gear mechanism (30) to which the first shaft (26) is connected; a drive shaft (32) which is connected to the planetary gear mechanism (30) for rotatably driving the drive wheel (WR); a first power transmission mechanism (68) which transmits a rotational drive force of the second shaft (66) to the planetary gear mechanism (30); a second power transmission mechanism (70) which transmits a rotational drive force of the second shaft (66) to the drive shaft (32); a first one-way clutch portion (72) which allows the transmission of a rotational drive force to the first power transmission mechanism (68) from the second shaft (66) only when the second shaft (66) is rotated in the normal direction: and a second one-way clutch portion (74) which allows the transmission of a rotational drive force to the second power transmission mechanism (70) from the second shaft (66) only when the second shaft (66) is rotated in the reverse direction, the swing unit (12) transmits a rotational drive force of the first shaft (26) to the drive wheel (WR) by way of the planetary gear mechanism (30) and the drive shaft (32) only when the first rotary electric machine (24) is driven. When the second shaft (66) is rotated in the normal direction by driving both the first rotary electric machine (24) and the second rotary electric machine (64), a rotational drive force of the first shaft (26) and a rotational drive force transmitted to the first power transmission mechanism (68) from the second shaft (66) by way of the first one-way clutch portion (72) are combined by the planetary gear mechanism (30) and a product of rotational drive forces is transmitted to the drive wheel (WR) by way of the drive shaft (32) in a state where a rotational speed is increased. When the second shaft (66) is rotated in the reverse direction by driving both the first rotary electric machine (24) and the second rotary electric machine (64), a rotational drive force transmitted to the planetary gear mechanism (30) from the first shaft (26) and a rotational drive force transmitted to the second power transmission mechanism (70) from the second shaft (66) by way of the second one-way clutch portion (74) are combined by the drive shaft (32) and a product of rotational drive forces is transmitted to the drive wheel (WR) in a state where a torque is increased. The first rotary electric machine (24) and the second rotary electric machine (64) are arranged parallel to each other in the longitudinal direction of a vehicle such that an axis (Ax2) of a second rotor (78) which constitutes the second rotary electric machine (64) is positioned in front of an axis (Ax1) of a first rotor (38) which constitutes the first rotary electric machine (24) along the vehicle body, and the first power transmission mechanism (68) and the second power transmission mechanism (70) are arranged inside the first rotary electric machine (24) and the second rotary electric machine (64) in the vehicle widthwise direction.

Parenthesized symbols are given in accordance with symbols used in attached drawings for facilitating the understanding of the present invention, and the present invention should not be construed in such a manner that the present invention is limited to elements indicated by these symbols.

According to an embodiment of the present invention, the first one-way clutch portion (72) and the second one-way clutch portion (74) are mounted on the second shaft (66).

According to an embodiment of the present invention, the swing unit (12) further includes a clutch means (58) which is arranged on a power transmitting path between the first one-way clutch portion (72) and the planetary gear mechanism (30), and while allowing the transmission of a rotational drive force to the planetary gear mechanism (30) from the second shaft (66), prevents the transmission of a rotational drive force to the second shaft (66) from the planetary gear mechanism (30).

According to an embodiment of the present invention, the planetary gear mechanism (30) includes: a sun gear (46) which is connected to the first shaft (26): a ring gear (50) to which a rotational drive force of the first power transmission mechanism (68) is transmitted; planetary gears (48) which are meshed with the sun gear (46) and the ring gear (50) respectively; and a carrier (52) which pivotally supports the planetary gears (48) in a state where the carrier (52) is connected to the drive shaft (32), and the second power transmission mechanism (70) is constituted of a chain or a belt which extends between and is wound around the second one-way clutch portion (74) and the carrier (52).

According to an embodiment of the present invention, a first sprocket (88) around which the second power transmission mechanism (70) is wound is mounted on the carrier (52), a second sprocket (90) around which the second power transmission mechanism (70) is wound is mounted on the second one-way clutch portion (74), and the sun gear (46), the planetary gears (48) and the ring gear (50) are arranged between the first sprocket (88) and the second sprocket (90).

According to an embodiment of the present invention, the swing unit (12) further includes a centrifugal clutch (28) which is positioned outside the first rotary electric machine (24) in the vehicle widthwise direction, and connects and disconnects the first rotor (38) and the first shaft (26) corresponding to a rotational speed of the first rotor (38).

ADVANTAGEOUS EFFECT OF THE INVENTION

According to an embodiment of the present invention, the first rotary electric machine and the second rotary electric machine are arranged parallel to each other in the longitudinal direction of the vehicle in a state where the axis of the second rotor is positioned in front of the axis of the first rotor along the vehicle body. Due to such a constitution, the swing unit can be made thin. Further, unlike a multilayered coaxial rotary electric machine, it is unnecessary to increase a diameter of one-side rotary electric machine and hence, it is possible to prevent a height position of a lower surface of the swing unit from becoming excessively low.

For example, when only the first rotary electric machine is driven, it is possible to output only a rotational drive force of the first shaft to the drive wheel (first operation mode: ECO (Environmental Communication) operation mode).

Further, for example, when the second shaft is rotated in the normal direction by driving both the first rotary electric machine and the second rotary electric machine, it is possible to increase a rotational speed of the drive wheel compared to the first operation mode (second operation mode: SPEED operation mode). Here, the swing unit includes the second one-way clutch portion and hence, there is no possibility that a rotational drive force of the second shaft is transmitted to the second power transmission mechanism.

Still further, for example, when the second shaft is rotated in the reverse direction by driving both the first rotary electric machine and the second rotary electric machine, a torque of the drive wheel is increased compared to the first operation mode (third operation mode: POWER operation mode). Since the swing unit includes the first one-way clutch portion, there is no possibility that a rotational drive force of the second shaft is transmitted to the first power transmission mechanism.

In this manner, the plurality of operation modes can be easily switched with the simple constitution and hence, the first rotary electric machine and the second rotary electric machine can be driven within a highly efficient range over wide operation regions. Further, since it is unnecessary to control connection/disconnection of the clutch at the time of switching an operation mode, complicated mechanisms and controls become unnecessary. Further, the first power transmission mechanism and the second power transmission mechanism are arranged inside the first rotary electric machine in the vehicle widthwise direction and hence, the swing unit can be made more compact.

According to an embodiment of the present invention, the first one-way clutch portion and the second one-way clutch portion are mounted on the second shaft and hence, the constitution of the swing unit can be made compact.

According to an embodiment of the present invention, the clutch means which prevents the transmission of a rotational drive force to the second shaft from the planetary gear mechanism while allowing the transmission of a rotational drive force to the planetary gear mechanism from the second shaft is arranged on the power transmitting path between the first one-way clutch portion and the planetary gear mechanism. Due to such a constitution, for example, in the first operation mode, it is possible to prevent a rotational drive force transmitted to the planetary gear mechanism from the first shaft from being transmitted to the second shaft. Accordingly, the rotational drive force of the first shaft can be efficiently transmitted to the drive shaft.

According to an embodiment of the present invention, the second power transmission mechanism is constituted of the chain or the belt which extends between and is wound around the second one-way clutch portion and the carrier. Due to such a constitution, the swing unit can be simplified compared to a case where the second power transmission mechanism is constituted of a gear or the like.

According to an embodiment of the present invention, the sun gear, the planetary gears and the ring gear are arranged between the first sprocket mounted on the carrier and the second sprocket mounted on the second one-way clutch portion and hence, the swing unit can be made thinner.

According to an embodiment of the present invention, the centrifugal clutch is arranged outside the first rotary electric machine in the vehicle widthwise direction and hence, with the simple structure, it is possible to prevent the first rotary electric machine from being overloaded at the time of starting.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a preferred embodiment of an electrically-operated two-wheeled vehicle according to the present invention is exemplified, and is explained in detail in conjunction with attached drawings. In the explanation made hereinafter, the clockwise direction (normal direction) and the counterclockwise direction (reverse direction) are directions as viewed from the outside of a vehicle body (the left side of the vehicle body) in the vehicle widthwise direction.

Figure 1:
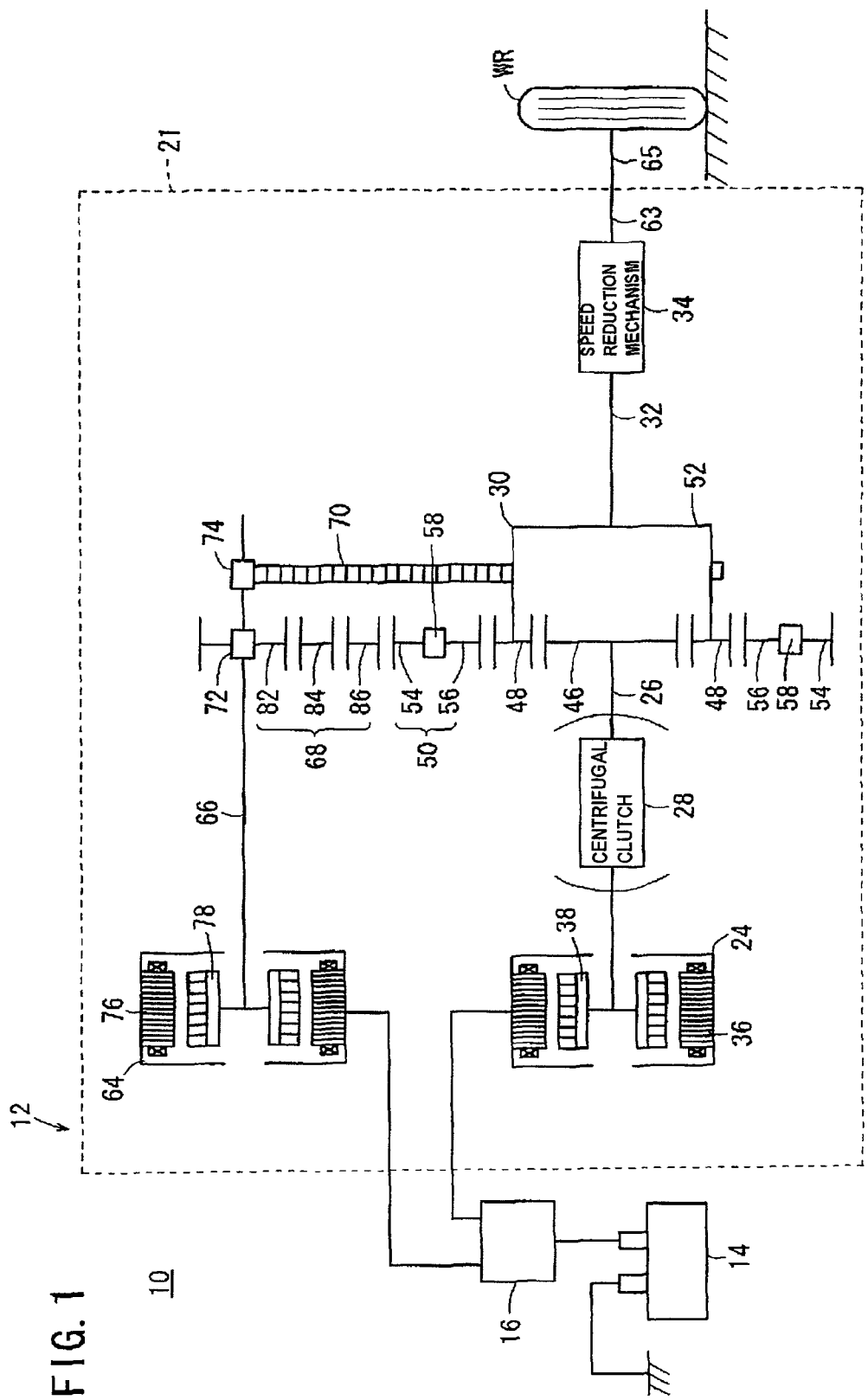
FIG. 1 is a schematic constitutional view of an electrically-operated two-wheeled vehicle according to the present invention.

As shown in FIG. 1, an electrically-operated two-wheeled vehicle 10 includes: a swing unit 12 which is swingably mounted on a vehicle body frame not shown in the drawing and pivotally supports a rear wheel WR which constitutes a drive wheel; a battery 14; and a control part 16.

Figure 2:
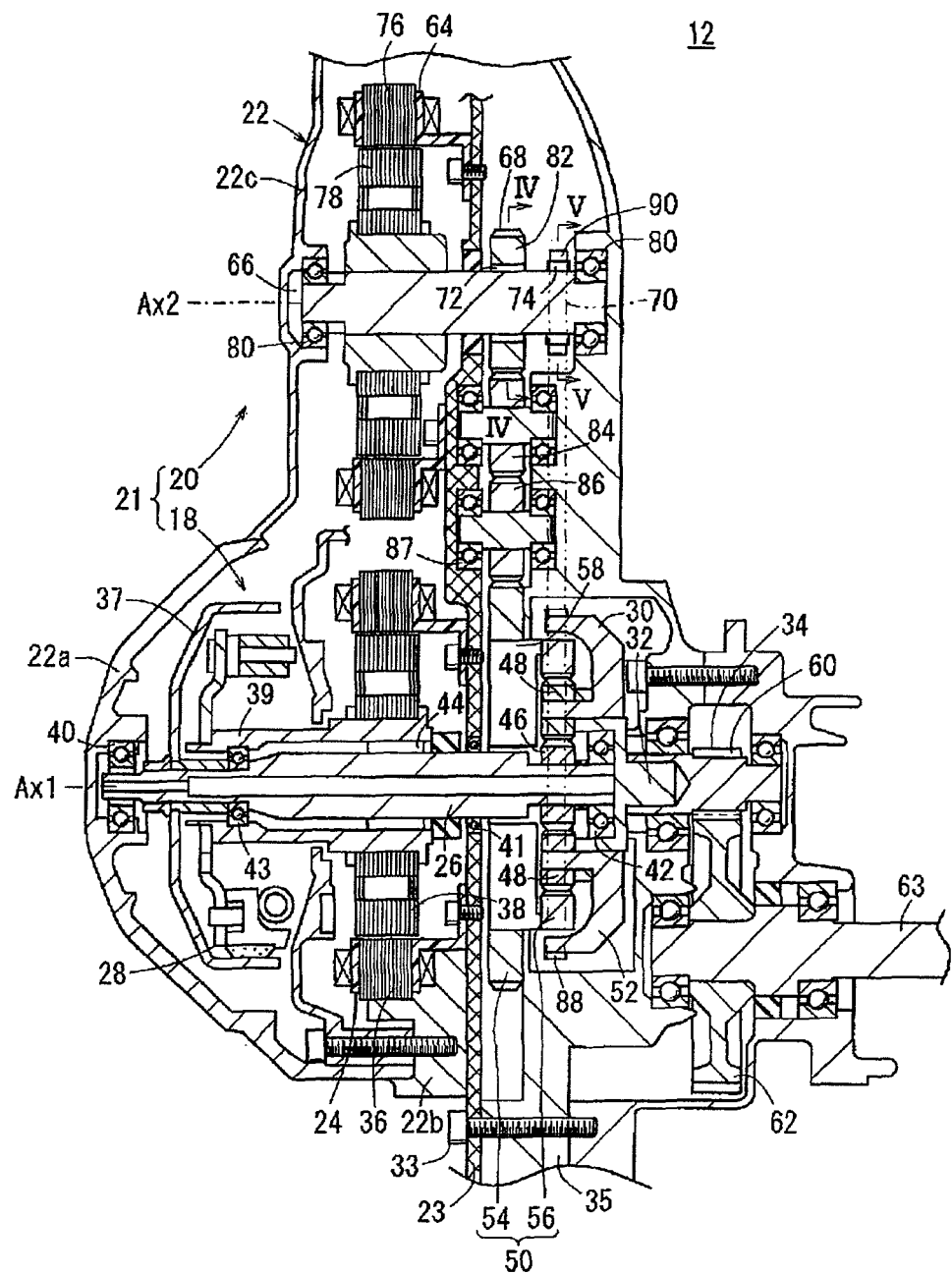
FIG. 2 is a longitudinal cross-sectional view of a swing unit shown in FIG. 1.

As shown in FIG. 2, the swing unit 12 includes: a power transmission device (power output device, energy regeneration device) 21 having a first mechanism 18 and a second mechanism 20 which is positioned in front of the first mechanism 18 in the longitudinal direction of the vehicle body; and a cover member 22 which surrounds the first mechanism 18 and the second mechanism 20.

The first mechanism 18 includes: a first rotary electric machine 24 which constitutes a drive source; a first shaft 26 which extends along the vehicle widthwise direction and is rotated by driving the first rotary electric machine 24; a centrifugal clutch 28 which is mounted on one end side of the first shaft 26; a planetary gear mechanism 30 which is connected to the other end side of the first shaft 26; a drive shaft 32 which is connected to the planetary gear mechanism 30; and a speed reduction mechanism 34 which is connected to the drive shaft 32.

The first rotary electric machine 24 includes: an annular first stator 36 which is fixed to a partition wall 23 which is mounted on a supporting member 35 for supporting the speed reduction mechanism 34 by a bolt 33, and a hollow first rotor 38 which is arranged in a center hole formed in the first stator 36. The battery 14 is electrically connected to the first stator 36 through the control part 16 (see FIG. 1). The control part 16 controls an energizing current by switching the connection between the battery 14 and the first stator 36 thus allowing the first rotary electric machine 24 to function as a motor or a generator.

The first rotor 38 extends toward the outside (a left side in FIG. 2) of the first stator 36 in the vehicle widthwise direction. An inner housing 37 of the above-mentioned centrifugal clutch 28 is mounted on a one-end portion of a fixing portion 39 of the first rotor 38. That is, the centrifugal clutch 28 is positioned outside the first rotary electric machine 24 in the vehicle widthwise direction.

The centrifugal clutch 28 connects the first rotor 38 and the first shaft 26 to each other or disconnects the first rotor 38 and the first shaft 26 from each other corresponding to a rotational speed of the first rotor 38. In other words, the centrifugal clutch 28 connects the first rotor 38 and the first shaft 26 to each other only when the rotational speed of the first rotor 38 exceeds a predetermined rotational speed. Due to such a constitution, with the simple structure, it is possible to preferably prevent the first rotary electric machine 24 from being overloaded at the time of starting the vehicle.

The first shaft 26 passes through the inside of the first rotor 38. The first shaft 26 is pivotally supported on a plurality of bearings 40, 41, 42. The bearing 40 is positioned at a one-end portion of the first shaft 26, and is fixedly mounted on the cover member 22. The bearing 41 is positioned at an approximately center portion of the first shaft 26 and is fixedly mounted on the partition wall 23. The bearing 42 is positioned at the other end portion of the first shaft 26 and is fixedly mounted on the drive shaft 32.

Further, a bearing 43 and a roller bearing 44 are interposed in a gap between an inner peripheral surface of the first rotor 38 and an outer peripheral surface of the first shaft 26. Due to such a constitution, the first rotor 38 of the first rotary electric machine 24 is rotatably supported on the first shaft 26.

Figure 3:
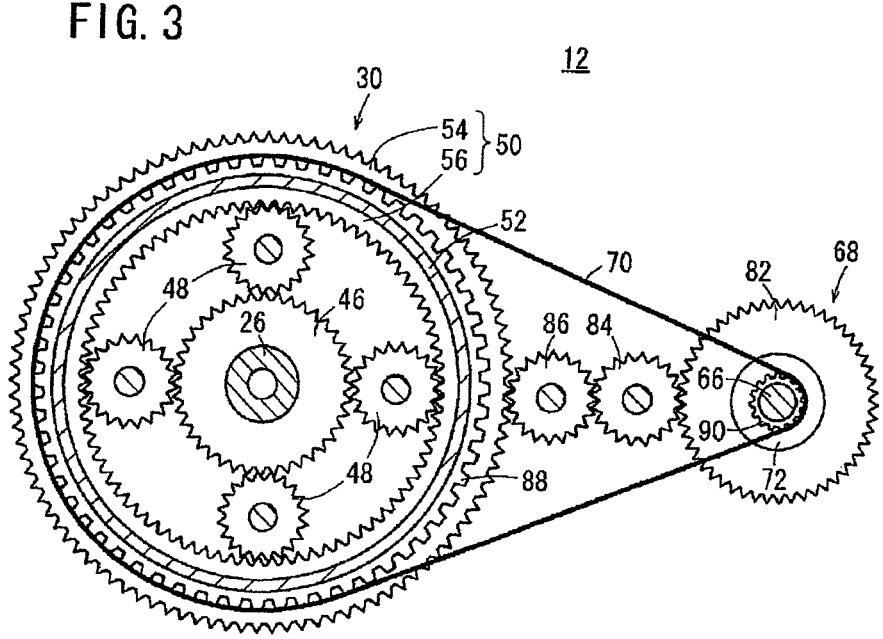
FIG. 3 is a side view with a part in cross section of the swing unit for explaining the constitution of a planetary gear mechanism, a first power transmission mechanism and a second power transmission mechanism shown in FIG. 2.

As shown in FIG. 3, the planetary gear mechanism 30 includes: a sun gear 46 which is fixedly mounted on an outer peripheral surface of the first shaft 26 on the other end side of the first shaft 26; a plurality of (four, for example) planetary gears 48 which are meshed with the sun gear 46, an annular ring gear 50 which is meshed with the respective planetary gears 48, and a carrier 52 which pivotally supports the plurality of planetary gears 48 (see FIG. 2).

The sun gear 46 and the respective planetary gears 48 are formed as external gears. The respective planetary gears 48 are rotated and also revolved around the sun gear 46. The ring gear 50 includes an outer ring gear (first ring gear) 54 having external teeth formed on an outer peripheral surface of the ring gear 50 and an inner ring gear (second ring gear) 56 having internal teeth formed on an inner peripheral surface of the ring gear 50.

As can be understood from FIG. 2, the outer ring gear 54 is positioned outside the inner ring gear 56 in the vehicle widthwise direction. The outer ring gear 54 and the inner ring gear 56 are connected with each other by way of a clutch mechanism (clutch means) 58. The detailed structure of the clutch mechanism 58 is explained later.

The carrier 52 is positioned inside (right side in FIG. 2) the respective planetary gears 48 in the vehicle widthwise direction. The carrier 52 is formed into an annular shape, and an outer edge portion of the carrier 52 is bent toward the outside in the vehicle widthwise direction. That is, the outer edge portion of the carrier 52 surrounds the inner ring gear 56 from the outer side in the radial direction of the inner ring gear 56.

The planetary gear mechanism 30 having the above-mentioned constitution combines a rotational drive force inputted from the sun gear 46 and a rotational drive force inputted from the ring gear 50 to each other and transmits a combined rotational drive force to the carrier 52 in a state where a rotational speed is increased.

The drive shaft 32 is fitted in a center hole portion of the carrier 52. That is, the drive shaft 32 is connected with the carrier 52 so that the drive shaft 32 is rotated integrally with the carrier 52. The speed reduction mechanism 34 includes: a first speed reduction gear portion 60 which is connected to the other end portion of the drive shaft 32; and a second speed reduction gear portion 62 which is meshed with the first speed reduction gear portion 60. An axle 65 which pivotally supports the rear wheel WR is connected to a shaft 63 which constitutes the second speed reduction gear portion 62 (see FIG. 1).

The second mechanism 20 includes: a second rotary electric machine 64 which constitutes an auxiliary drive source; a second shaft 66 which extends along the vehicle widthwise direction and is rotated by driving the second rotary electric machine 64; a first power transmission mechanism 68 which transmits a rotational drive force of the second shaft 66 to the outer ring gear 54 of the planetary gear mechanism 30; a second power transmission mechanism 70 which transmits a rotational drive force of the second shaft 66 to the carrier 52 of the planetary gear mechanism 30; and a first one-way clutch portion 72 and a second one-way clutch portion 74 which are mounted on the second shaft 66.

The second rotary electric machine 64 is configured in the same manner as the above-mentioned first rotary electric machine 24. That is, the second rotary electric machine 64 includes: an annular second stator 76 which is fixed to the partition wall 23 of the cover member 22; and a hollow second rotor 78 which is arranged in a center hole of the second stator 76. The battery 14 is electrically connected to the second stator 76 through the control part 16 (see FIG. 1). The second rotor 78 is rotatable in both normal and reverse directions.

The control part 16 controls an energizing current by switching the connection between the battery 14 and the second stator 76 thus allowing the second rotary electric machine 64 to function as a motor.

The second shaft 66 is pivotally supported on a pair of bearings 80 which is fixedly mounted on the cover member 22 in a state where the second shaft 66 is fitted in the center hole of the second rotor 78. That is, the second shaft 66 and the second rotor 78 are integrally rotated.

As shown in FIG. 2 and FIG. 3, the first power transmission mechanism 68 includes: a gear having an annular shape (annular gear) 82 which is mounted on the first one-way clutch portion 72; an idling gear portion (first idling gear portion) 84 which is meshed with the gear 82; and an idling gear portion (second idling gear portion) 86 which is meshed with the idling gear portion 84 and the outer ring gear 54.

The gear 82 and the idling gear portions 84, 86 are arranged in a row along the longitudinal direction of the vehicle. The respective idling gear portions 84, 86 have the same constitution, and are rotatably supported on a plurality of bearings 87 which are fixedly mounted on the cove member 22 (see FIG. 2).

Figure 5:
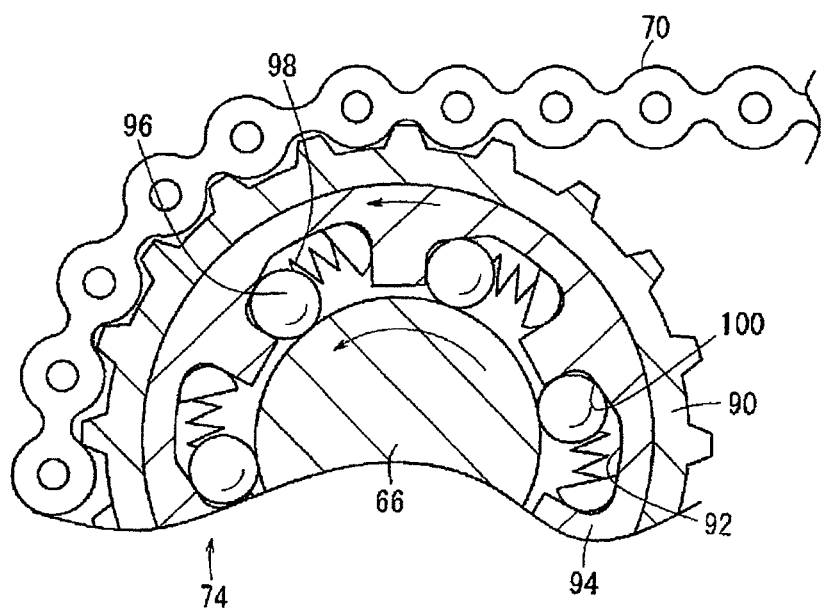
FIG. 5 is a cross-sectional view with a part omitted taken along a line V-V in FIG. 2.

The second power transmission mechanism 70 is formed of a chain, and is wound around and is extended between an annular first sprocket 88 which is fixedly mounted an outer edge portion of the carrier 52 and an annular second sprocket 90 which is fixedly mounted on the second one-way clutch portion 74 (see FIG. 5). Due to such a constitution, a rotational drive force of the second shaft 66 can be directly and efficiently transmitted to the carrier 52 and hence, the swing unit 12 can be simplified. Here, the second power transmission mechanism 70 may be formed of a V belt, a plurality of gears or the like.

Further, as can be understood from FIG. 2, the sun gear 46, the plurality of planetary gears 48 and the inner ring gear 56 are arranged between the first sprocket 88 and the second sprocket 90 around which the second power transmission mechanism 70 is wound. Due to such a constitution, a size of the swing unit 12 in the vehicle widthwise direction can be made small (the swing unit 12 can be made thin).

Figure 4:
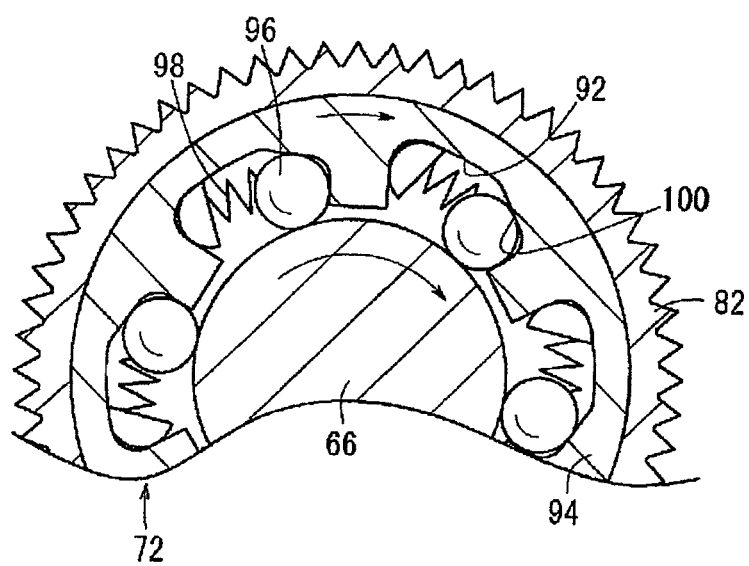
FIG. 4 is a cross-sectional view with a part omitted taken along a line IV-IV in FIG. 2.

As shown in FIG. 4, the first one-way clutch portion 72 includes: a ring body 94 which is arranged so as to surround an outer peripheral surface of the second shaft 66 and forms a plurality groove portions 92 having an arc-shaped cross section on an inner peripheral surface thereof along the circumference direction; and a roller bearing 96 and a resilient member 98 which are arranged in each groove portion 92 formed on the ring body 94.

An inner peripheral surface of the gear 82 is fixedly mounted on an outer peripheral surface of the ring body 94. A cam face 100 which is gradually inclined radially inwardly toward the second shaft 66 as the cam face 100 extends in the clockwise direction is formed on each groove portion 92.

Each roller bearing 96 is formed into a columnar shape. The resilient member 98 is arranged in the groove portion 92 on a side opposite to a side where the cam face 100 is formed, and biases the roller bearing 96 toward the cam face 100. A leaf spring, a coil spring or the like can be used as the resilient member 98.

In the first one-way clutch portion 72 having such a constitution, the roller bearing 96 is biased toward the cam face 100 by the resilient member 98 and hence, the roll bearing 96 is brought into contact with the cam face 100 in a state where the second shaft 66 and the ring body 94 are in a stopped state. That is, the roller bearings 96 are fixed between the cam face 100 and the outer peripheral surface of the second shaft 66 by a wedge action.

When the second shaft 66 is rotated in the clockwise direction, the ring body 94 is rotated in the clockwise direction in a state where the wedge action is maintained. On the other hand, when the second shaft 66 is rotated in the counterclockwise direction, the roller bearings 96 are separated from the cam faces 100 and hence, the second shaft 66 runs idle with respect to the ring body 94.

That is, the first one-way clutch portion 72 transmits a rotational drive force of the second shaft 66 to the first power transmission mechanism 68 only when the second shaft 66 is rotated in the clockwise direction.

As shown in FIG. 5, the second one-way clutch portion 74 is mounted on the second shaft 66 in such a mode where the second one-way clutch portion 72 is inverted by 180° with respect to the above-mentioned first one-way clutch part 72 about a line orthogonal to the axial direction of the first one-way clutch portion 72.

That is, the second one-way clutch portion 74 has the same constitution as the first one-way clutch portion 72. Accordingly, the constitutional parts of the second one-way clutch portion 74 which are substantially identical to constitutional parts of the first one-way clutch portion 72 are given the same reference numerals, and their detailed explanation is omitted. As can be understood from FIG. 5, an inner peripheral surface of the above-mentioned annular second sprocket 90 is fixedly mounted on an outer peripheral surface of the ring body 94 which constitutes the second one-way clutch portion 74.

In such a second one-way clutch portion 74, when the second shaft 66 is rotated in the counterclockwise direction, the second shaft 66 and the ring body 94 are integrally rotated in the counterclockwise direction. On the other hand, when the second shaft 66 is rotated in the clockwise direction, the second shaft 66 runs idle with respect to the ring body 94.

That is, the second one-way clutch portion 74 transmits a rotational drive force of the second shaft 66 to the second power transmission mechanism 70 only when the second shaft 66 is rotated in the counterclockwise direction.

Figure 6:
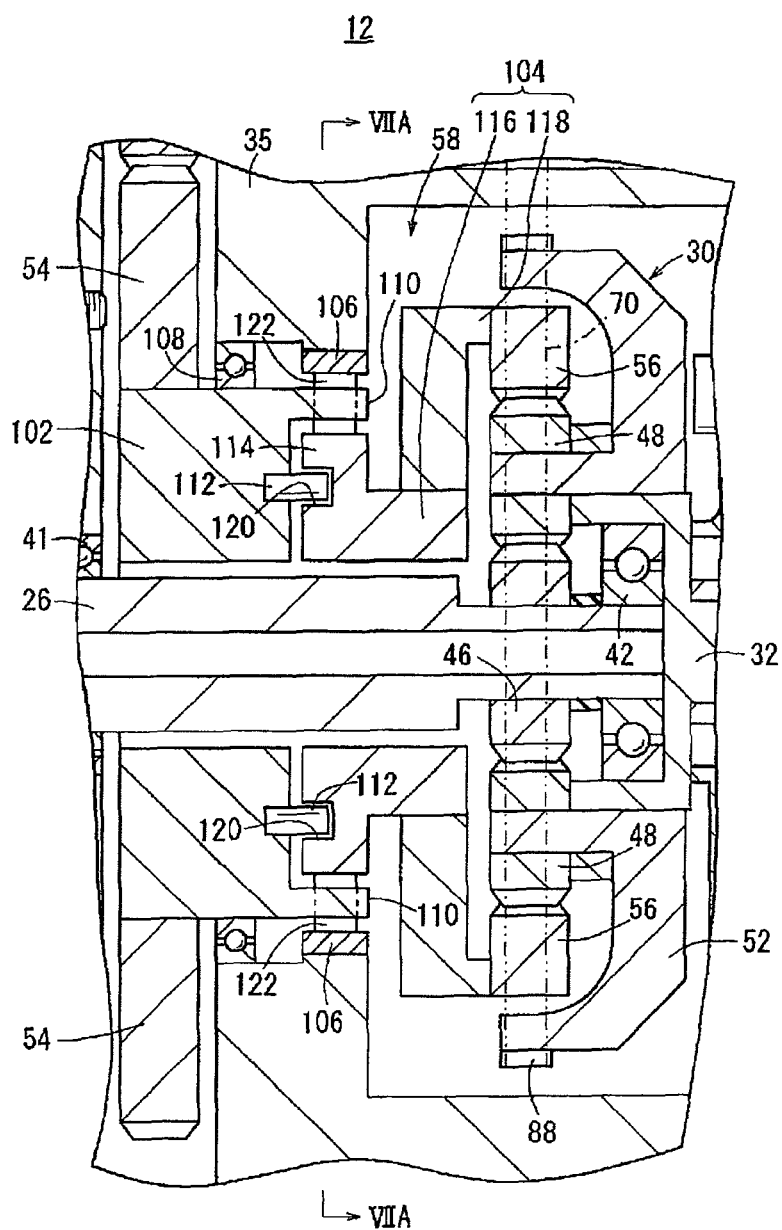
FIG. 6 is an enlarged cross-sectional view of a clutch mechanism shown in FIG. 2.
Figure 7A:
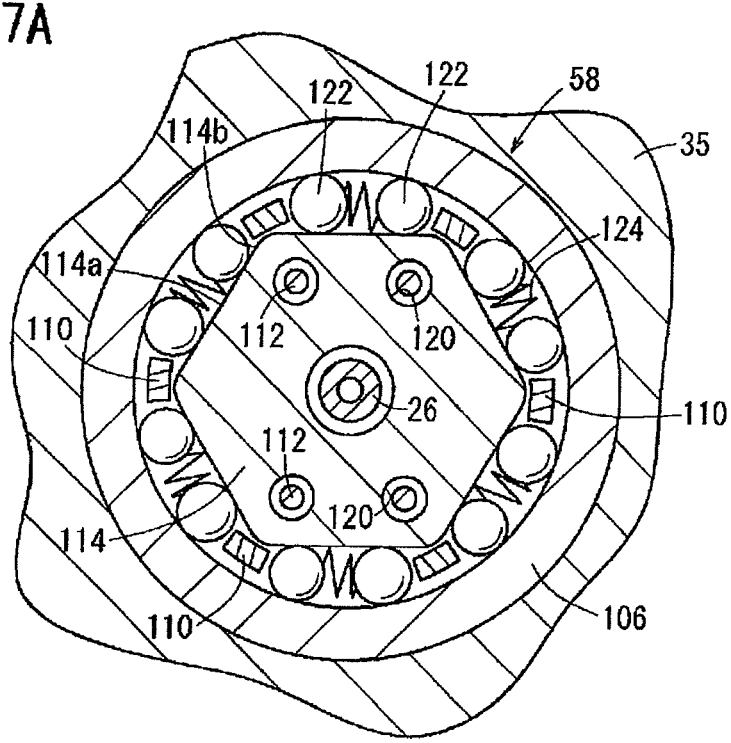
FIG. 7A is a cross-sectional view taken along a line VIIA-VIIA in FIG. 6.

As shown in FIG. 6 and FIG. 7A, the clutch mechanism 58 includes: a hollow outer connection shaft (first connection shaft) 102 on which an inner peripheral surface of the outer ring gear 54 is fixedly mounted; an inner connection shaft (second connection shaft) 104 which is arranged coaxially with the outer connection shaft 102; and an outer ring member 106 which is fixedly mounted on the support member 35 and surrounds one end portion of the inner connection shaft 104.

The outer connection shaft 102 is pivotally supported on a bearing 108 which is fixedly mounted on the support member 35. To an outer edge portion of the other end surface of the outer connection shaft 102, between one end portion of the inner connection shaft 104 and the outer ring member 106, a plurality of first engaging members 110 are connected such that the first engaging members 110 are arranged in a spaced-apart manner by a predetermined distance in the circumferential direction of the outer connection shaft 102. Further, in the other end surface of the outer connection shaft 102, one end portions of a plurality of (four, for example) second engaging members 112 which are formed into a columnar shape are embedded.

The inner connection shaft 104 includes: a connection shaft body 116 having a cam portion 114 which constitutes one end portion of the inner connection shaft 104; and a connecting member 118 which connects the connection shaft body 116 and the inner ring gear 56 to each other. A plurality of (four) recessed portions 120 into which the other end portions of the second engaging members 112 are inserted are formed on one end surface of the cam portion 114. The outer periphery of the cam portion 114 has an approximately hexagonal shape in cross section.

Between the first engaging members 110 arranged adjacent to each other, a pair of rollers 122 which is arranged on a flat surface 114a which constitutes an outer surface of the cam portion 114 and a resilient member 124 which is interposed between these rollers 122 and biases the respective rollers 122 toward cam faces 114b which form corner portions of the cam portion 114 are arranged. A spring member such as a coil spring or a leaf spring can be used as the resilient member 124, for example.

In the clutch mechanism 58 having such a constitution, the pair of rollers 122 is biased toward the cam face 114b by the resilient member 124 and hence, it is possible to bring the pair of rollers 122 into contact with the cam faces 114b in a state where the outer ring gear 54 and the inner ring gear 56 are in a stopped state. Due to such a constitution, the pair of rollers 122 is fixed by a wedge action brought about by the cam faces 114b of the inner connection shaft 104 connected to the inner ring gear 56 and an inner peripheral surface of the outer ring member 106 and hence, it is possible to prevent the rotation of the inner ring gear 56 in a state where the outer ring gear 54 is in a stopped state.

Figure 7B:
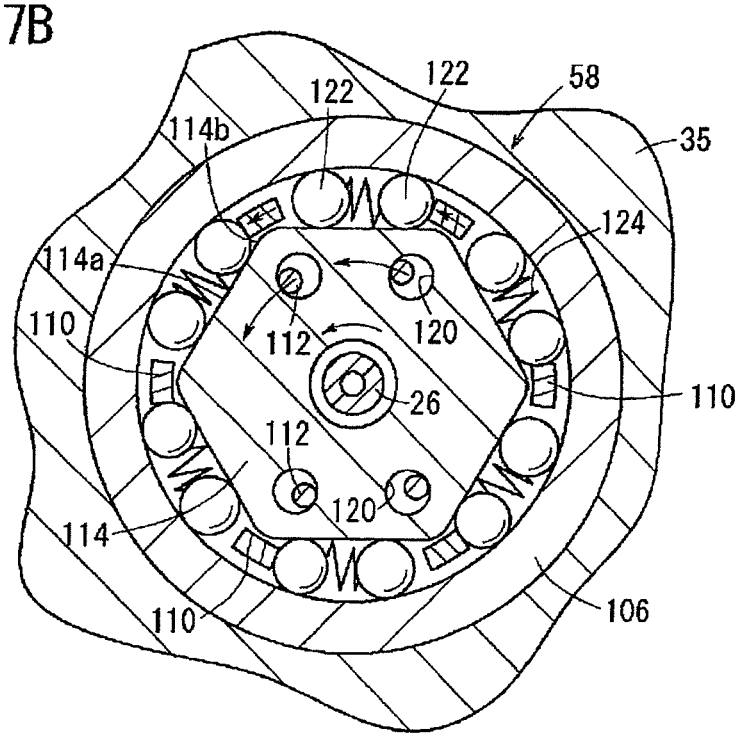
FIG. 7B is a cross-sectional view for explaining the manner of operation of the clutch mechanism when an outer ring gear is rotated in the counterclockwise direction.

On the other hand, as shown in FIG. 7B, for example, when the outer ring gear 54 is rotated in the counterclockwise direction, the outer connection shaft 102 connected to the outer ring gear 54, the first engaging members 110 and the second engaging members 112 are integrally rotated. Due to such rotation, the first engaging member 110 pushes the pair of rollers 122 in the counterclockwise direction, and also the second engaging member 112 pushes a wall surface constituting the recessed portion 120 formed on the inner connection shaft 104 in the counterclockwise direction. As a result, the pair of rollers 122, the resilient member 124 and the inner connection shaft 104 are integrally rotated in the counterclockwise direction.

That is, while allowing the transmission of a rotational drive force to the inner ring gear 56 from the outer ring gear 54, the clutch mechanism 58 can prevent the transmission of a rotational drive force to the outer ring gear 54 from the inner ring gear 56.

As can be understood from FIG. 2, the cover member 22 includes: a first cover 22a which covers the first rotary electric machine 24; a second cover 22b which is arranged on the partition wall 23 in a state where the second cover 22b is mounted on the first cover 22a; and a third cover 22c which is mounted on the first cover 22a and covers the second rotary electric machine 64. The connection between the first cover 22a and the second cover 22b and the connection between the first cover 22a and the third cover 22c may be performed using a fixing member such as bolts not shown in the drawing.

The control part 16 can suitably select from a group consisting of a first operation mode (ECO (Environmental Communication) drive operation mode) at a low speed with a low drive force, a second operation mode (SPEED drive operation mode) at a high speed with a low drive force, a third operation mode (POWER drive operation mode) at a low speed with a high drive force, and a regeneration mode where a rotational drive force of the rear wheel WR is converted into electrical energy and the battery is charged with the electrical energy (energy being recovered).

Next, the explanation is made with respect to the first to third operation modes and the regeneration mode in conjunction with FIG. 8 to FIG. 12. In FIG. 8 to FIG. 10 and FIG. 12, constitutional elements indicated by a bold line indicate parts to which power (electric power) is transmitted, arrows indicated by a solid line indicate directions along which the power is transmitted, and arrows indicated by a broken line indicate directions along which the electric power is transmitted.

Figure 8:
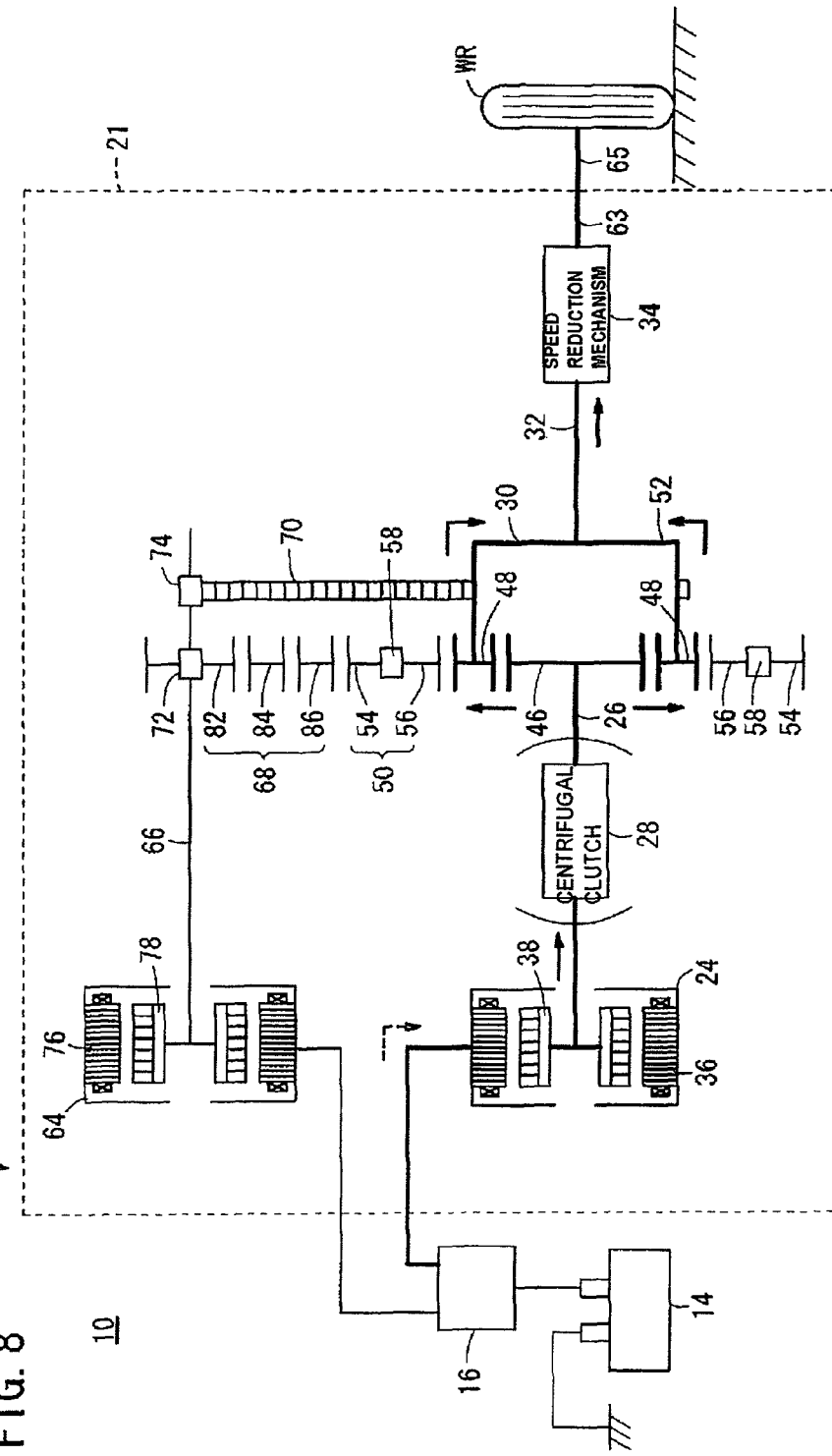
FIG. 8 is a schematic constitutional view of the electrically-operated two-wheeled vehicle for explaining the flow of power when the vehicle is operated in a first operation mode (ECO operation drive mode)

Firstly, as shown in FIG. 8, in the first operation mode, the control part 16 drives the first rotary electric machine 24 thus rotating the first rotor 38 in the counterclockwise direction and stopping the second rotary electric machine 64. Due to such an operation, when a rotational speed of the first rotor 38 reaches a predetermined rotational speed, the first rotor 38 and the first shaft 26 are connected with each other by the centrifugal clutch 28 whereby the first shaft 26 is rotated in the counterclockwise direction.

Then, a rotational drive force of the first shaft 26 is transmitted to the drive shaft 32 through the sun gear 46, the plurality of planetary gears 48 and the carrier 52. Here, since the inner ring gear 56 is locked by the clutch mechanism 58, there is no possibility that a rotational drive force of the sun gear 46 is transmitted to the outer ring gear 54 and the like. Accordingly, it is possible to efficiently transmit a rotational drive force of the first shaft 26 to the drive shaft 32.

The rotational drive force transmitted to the drive shaft 32 is transmitted to the rear wheel WR in a state where a rotational speed is lowered (a torque is increased) by the speed reduction mechanism 34. As a result, the rear wheel WR is rotated only by a rotational drive force of the first rotary electric machine 24. In this case, a range where the first rotary electric machine 24 is efficiently operated falls within a range indicated in a graph shown in FIG. 11A (hatched region).

Figure 9:
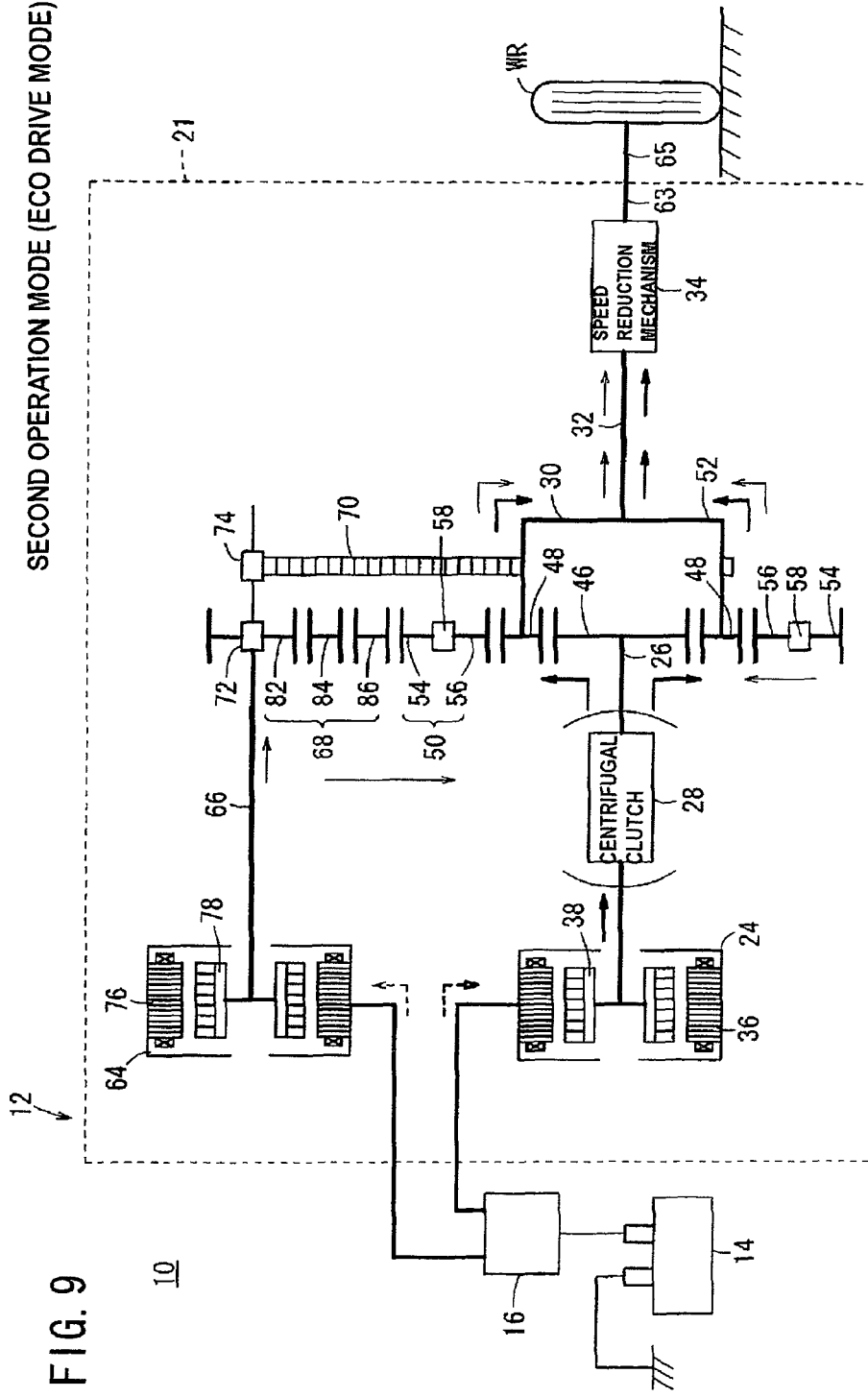
FIG. 9 is a schematic constitutional view of the electrically-operated two-wheeled vehicle for explaining the flow of power when the vehicle is operated in a second operation mode (SPEED operation drive mode)

To explain subsequently, as shown in FIG. 9, in the second operation mode, the control part 16 drives both the first rotary electric machine 24 and the second rotary electric machine 64 thus rotating the first rotor 38 in the counterclockwise direction and also rotating the second rotor 78 in the clockwise direction. Due to such an operation, a rotational drive force of the first rotor 38 is transmitted to the sun gear 46 through the centrifugal clutch 28 and the first shaft 26.

On the other hand, a rotational drive force of the second rotor 78 is transmitted to the inner ring gear 56 through the second shaft 66, the first power transmission mechanism 68 (the gear 82, the pair of idling gears 84, 86), the outer ring gear 54 and the clutch mechanism 58. Here, the second shaft 66 is rotated in the clockwise direction so that there is no possibility that a rotational drive force of the second shaft 66 is transmitted to the second power transmission mechanism 70.

A rotational drive force transmitted to the sun gear 46 and a rotational drive force transmitted to the inner ring gear 56 are combined with each other by the plurality of planetary gears 48, and the combined rotational drive force is transmitted to the drive shaft 32 through the carrier 52 in a state where the rotational speed is increased. The rotational drive force transmitted to the drive shaft 32 is transmitted to the rear wheel WR through the speed reduction mechanism 34. As a result, the rotational speed of the rear wheel WR in the second operation mode becomes larger than the rotational speed of the rear wheel WR in the first operation mode. In this case, a range where the first rotary electric machine 24 and the second rotary electric machine 64 are efficiently operated falls within a range indicated in a graph shown in FIG. 11B (hatched region).

Figure 10:
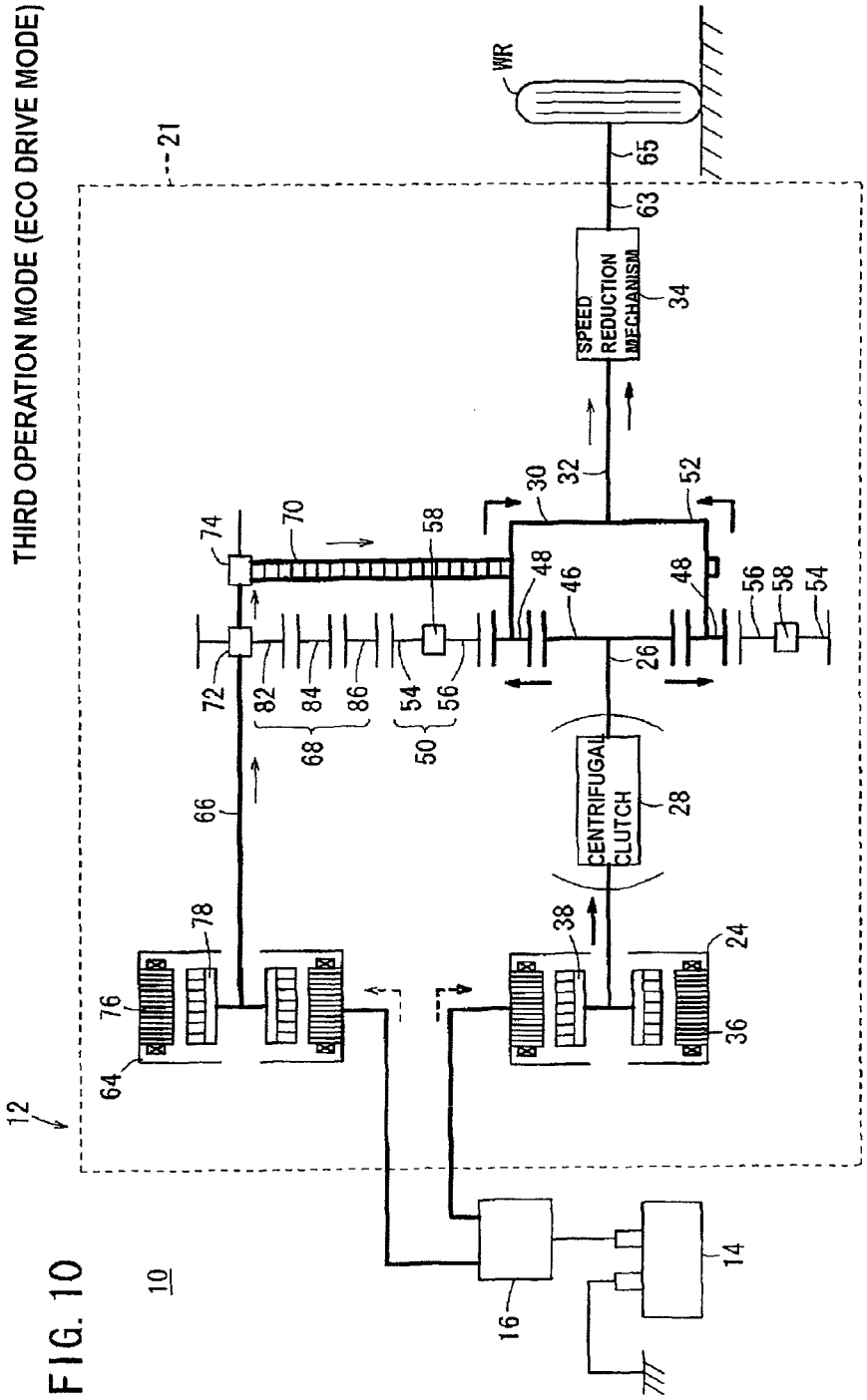
FIG. 10 is a schematic constitutional view of the electrically-operated two-wheeled vehicle for explaining the flow of power when the vehicle is operated in a third operation mode (POWER drive operation mode)
Figure 11A:
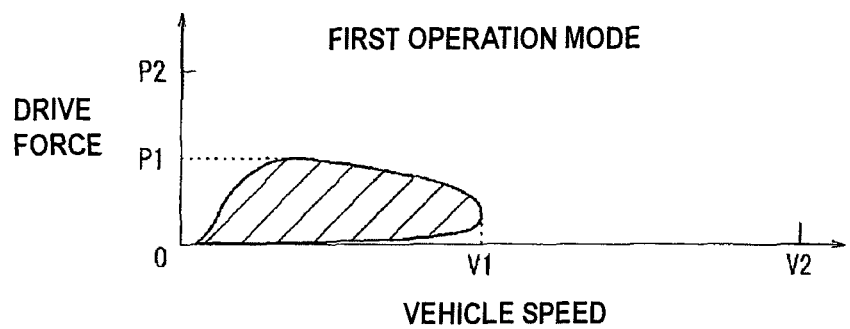
FIG. 11A is a graph showing an operation range where a first rotary electric machine is efficiently operated in the first operation mode.
Figure 11B:
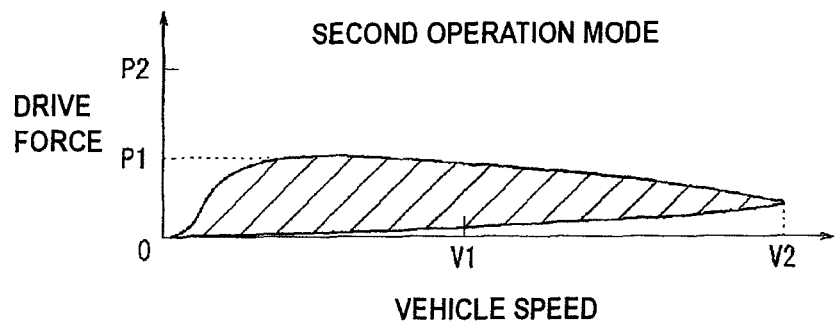
FIG. 11B is a graph showing an operation range where the first rotary electric machine and a second rotary electric machine are efficiently operated in the second operation mode.
Figure 11C:
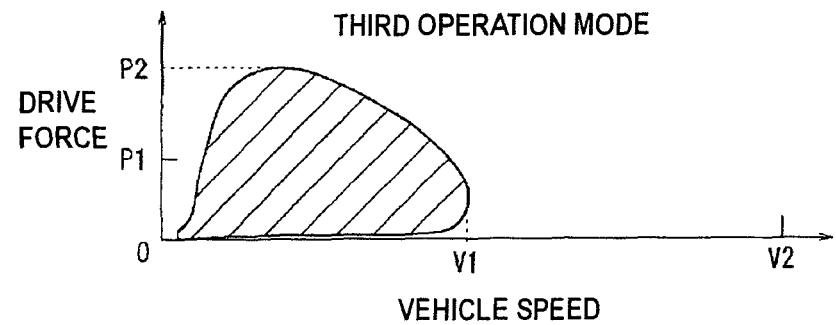
FIG. 11C is a graph showing an operation range where the first rotary electric machine and the second rotary electric machine are efficiently operated in the third operation mode.

Next, as shown in FIG. 10, in the third operation mode, the control part 16 drives both the first rotary electric machine 24 and the second rotary electric machine 64 thus rotating the first rotor 38 and the second rotor 78 in the counterclockwise direction. Due to such an operation, a rotational drive force of the first rotor 38 is transmitted to the plurality of planetary gears 48 through the centrifugal clutch 28, the first shaft 26 and the sun gear 46.

On the other hand, a rotational drive force of the second rotor 78 is transmitted to the second shaft 66, the second one-way clutch portion 74 and the second power transmission mechanism 70. Here, the second shaft 66 is rotated in the counterclockwise direction so that there is no possibility that a rotational drive force of the second shaft 66 is transmitted to the first power transmission mechanism 68.

A rotational drive force transmitted to the plurality of planetary gears 48 and a rotational drive force transmitted to the second power transmission mechanism 70 are combined with each other by the carrier 52, and the combined rotational drive force is transmitted to the drive shaft 32 in a state where a torque is increased. The rotational drive force transmitted to the drive shaft 32 is transmitted to the rear wheel WR through the speed reduction mechanism 34. As a result, a torque of the rear wheel WR in the third operation mode becomes larger than the torque of the rear wheel WR in the first operation mode. In this case, a range where the first rotary electric machine 24 and the second rotary electric machine 64 are efficiently operated falls within a range indicated in a graph shown in FIG. 11C (hatched region).

In this manner, in this embodiment, the plurality of operation modes can be easily switched with the simple constitution and hence, the first rotary electric machine and the second rotary electric machine can be driven within a highly efficient range over wide operation regions. Further, since it is unnecessary to control the connection/disconnection of the clutch at the time of switching an operation mode, complicated mechanisms and controls become unnecessary.

Figure 12:
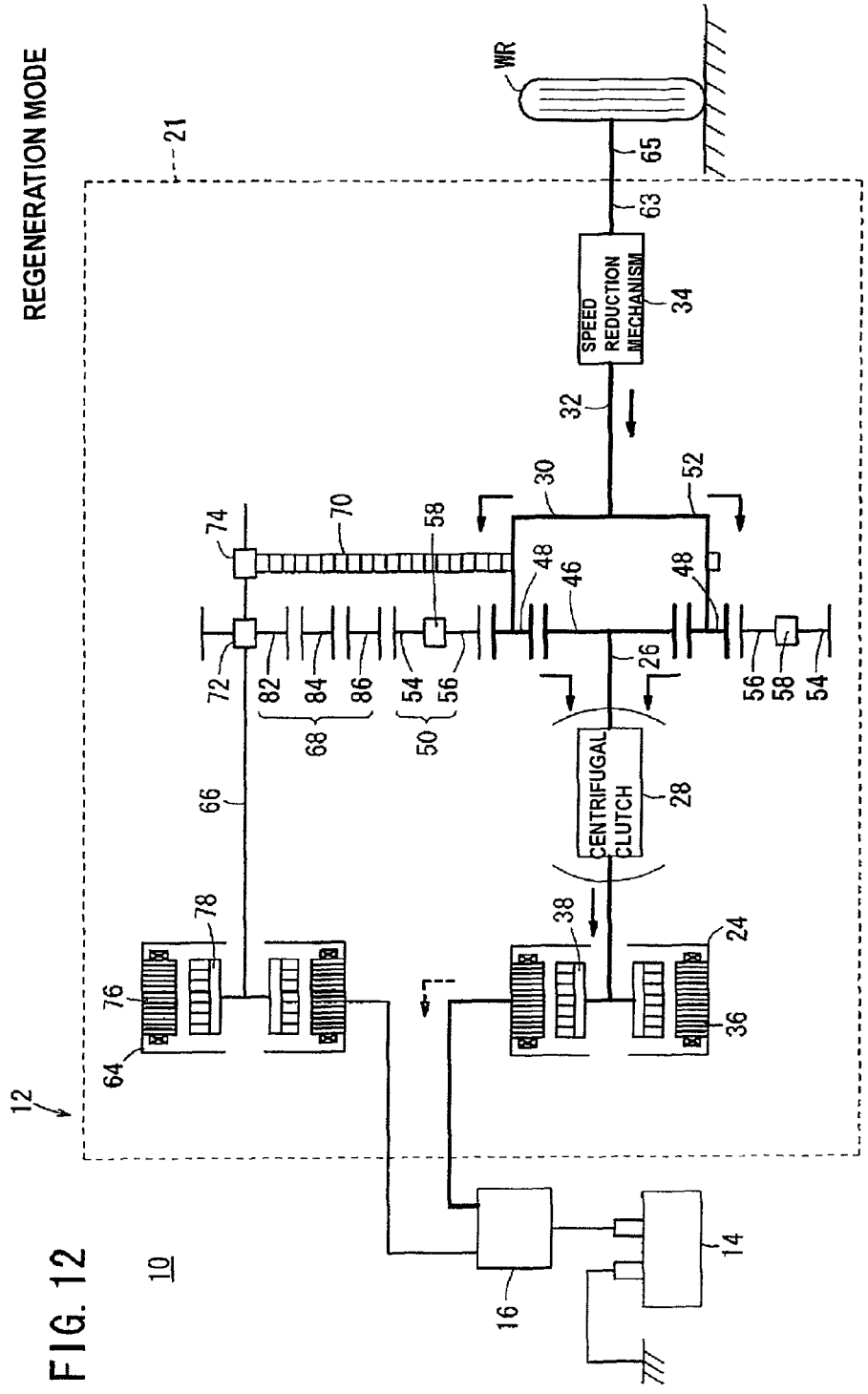
FIG. 12 is a schematic explanatory view of the electrically-operated two-wheeled vehicle for explaining the flow of power when the vehicle is operated in a regeneration mode.

Further, as shown in FIG. 12, in the regeneration mode, when the rear wheel WR is rotated in the counterclockwise direction, a rotational drive force of the rear wheel WR is transmitted to the carrier 52 by way of the speed reduction mechanism 34 and the drive shaft 32. When the carrier 52 is rotated, although the second power transmission mechanism 70 and the ring body 94 (see FIG. 5) which constitutes the second one-way clutch portion 74 are also rotated in the counterclockwise direction, there is no possibility that a rotational drive force of the ring body 94 is transmitted to the second shaft 66. That is, the second power transmission mechanism 70 runs idle with respect to the second shaft 66. Due to such a constitution, a rotational drive force of the carrier 52 is efficiently transmitted to the plurality of planetary gears 48.

Further, the rotational drive force transmitted to the plurality of planetary gears 48 is transmitted to the sun gear 46. Here, the inner ring gear 56 is locked by an action of the clutch mechanism 58 and hence, there is no possibility that the rotational drive force of the plurality of planetary gears 48 is transmitted to the outer ring gear 54.

In other words, in the regeneration mode, when the transmission of a rotational drive force to the second shaft 66 from the planetary gear mechanism 30 is prevented by the clutch mechanism 58, the first one-way clutch portion 72 locks the movement of the power transmission mechanism 68. That is, in the regeneration mode, the counterclockwise movement of the ring body 94 which constitutes the first one-way clutch portion 72 is locked by the roller bearings 96 (see FIG. 4) so that the movements of the gear 82, the first idling gear portion 84, the second idling gear portion 86 and the outer ring gear 54 are locked whereby, by an action of the clutch mechanism 58, the transmission of a rotational drive force to the second shaft 66 from the planetary gear mechanism 30 is prevented.

A rotational drive force transmitted to the sun gear 46 is transmitted to the first rotor 38 by way of the first shaft 26 and the centrifugal clutch 28. Due to such an operation, it is possible to charge the battery 14 with electrical energy generated by the first stator 36 by making use of the rotation of the first rotor 38.

According to this embodiment, the electrically operated two-wheeled vehicle includes the clutch mechanism 58 which prevents the transmission of a rotational drive force to the second shaft 66 from the planetary gear mechanism 30 while allowing the transmission of the rotational drive force to the planetary gear mechanism 30 from the second shaft 66. Due to such a constitution, it is possible to transmit the rotational drive force of the drive shaft 32 only to the first shaft 26 without transmitting the rotational drive force of the drive shaft 32 to the second shaft 66.

Accordingly, even in the case of the power transmission device 21 which includes the first rotary electric machine 24 and the second rotary electric machine 64, with the simple constitution, it is possible to allow only the first rotary electric machine 24 to function as a generator. Further, at the time of regenerating the energy, it is unnecessary to control the connection/disconnection of the clutch and hence, complicated controls become unnecessary.

Further, the clutch mechanism 58 is mounted on the ring gear 50 which constitutes the planetary gear mechanism 30 and hence, it is possible to prevent the transmission of a rotational drive force of the drive shaft 32 to the first power transmission mechanism 68. Due to such a constitution, the regeneration of the energy by the first rotary electric machine 24 can be performed.

That is, even in the case of the power transmission device 21 which is configured to drive both the first rotary electric machine 24 and the second rotary electric machine 64 as motors, with the simple constitution, it is possible to allow only the first rotary electric machine 24 to function as a generator.

Further, in this embodiment, as shown in FIG. 2, the first rotary electric machine 24 and the second rotary electric machine 64 are arranged parallel to each other in the longitudinal direction of the vehicle in a state where an axis Ax2 of the second rotor 78 is positioned in front of an axis A1 of the first rotor 38 along the vehicle body. Due to such a constitution, the swing unit 12 can be made thin. Further, unlike a multilayered coaxial rotary electric machine, it is unnecessary to increase a diameter of the rotary electric machine on one side and hence, it is possible to prevent a height position of a lower surface of the swing unit 12 from becoming excessively low.

According to this embodiment, the first one-way clutch portion 72 and the second one-way clutch portion 74 are mounted on the second shaft 66 and hence, the constitution of the swing unit 12 can be made compact.

Further, the first power transmission mechanism 68 and the second power transmission mechanism 70 are arranged inside the first rotary electric machine 24 in the vehicle widthwise direction. Due to such a constitution, the swing unit 12 can be made more compact.

In this embodiment, the gear 82 is fixedly mounted on the outer peripheral surface of the ring body 94 which constitutes the first one-way clutch portion 72, and the idling gear portions 84, 86 are interposed between the gear 82 and the outer ring gear 54. Due to such a constitution, it is possible to make the rotational direction of the ring body 94 and the rotational direction of the outer ring gear 54 reverse to each other. Due to such a constitution, with the simple constitution, in the regeneration mode, the movements of the gear 82, the idling gear portions 84, 86 and the outer ring gear 54 can be locked, and in the second operation mode, a rotational drive force of the second shaft 66 can be transmitted to the outer ring gear 54 through the first one-way clutch portion 72, the gear 82, and the idling gear portions 84, 86.

It is needless to say that the present invention is not limited to the above-mentioned embodiment and the present invention can adopt various constitutions without departing from the gist of the present invention.

For example, the second power transmission mechanism 70 may be formed of a chain or a belt which is extended between and is wound around the first sprocket 88 which is fixedly mounted on the drive shaft 32 and the second sprocket 90 which is fixedly mounted on the second one-way clutch portion 74.

Further, the second power transmission mechanism 70 may include: a first gear which has an outer peripheral surface on which the second one-way clutch portion 74 is fixedly mounted; a second gear which is fixedly mounted on an outer peripheral surface of the drive shaft 32; and an idling gear which is interposed between these gears and transmits a rotational drive force of the first gear to the second gear. Further, the power transmission device 21 may not be provided with the centrifugal clutch 28.

The clutch mechanism 58 is not limited to an example where the clutch mechanism 58 is mounted on the ring gear 50 and, for example, the clutch mechanism 58 may be mounted on the gear 82, the idling gear portion 82 or the idling gear portion 84.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrically-operated two-wheeled vehicle provided with a swing unit which pivotally supports a
    drive wheel in a state where the swing unit is mounted on a vehicle body, wherein
    the swing unit comprises:
    a first rotary electric machine which is capable of rotating a first shaft;
    a second rotary electric machine which is capable of rotating a second shaft in both normal and reverse directions;
    a planetary gear mechanism to which the first shaft is connected;
    a drive shaft which is connected to the planetary gear mechanism for rotatably driving the drive wheel;
    a first power transmission mechanism which transmits the rotational drive force of the second shaft to the planetary gear mechanism;
    a second power transmission mechanism which transmits the rotational drive force of the second shaft to the drive shaft;
    a first one-way clutch portion which allows transmission of a rotational drive force to the first power transmission mechanism from the second shaft only when the second shaft is rotated in the normal direction: and
    a second one-way clutch portion which allows transmission of a rotational drive force to the second power transmission mechanism from the second shaft only when the second shaft is rotated in the reverse direction,
    the swing unit transmits a rotational drive force of the first shaft to the drive wheel by way of the planetary gear mechanism and the drive shaft only when the first rotary electric machine is driven,
    when the second shaft is rotated in the normal direction by driving both the first rotary electric machine and the second rotary electric machine, the rotational drive force of the first shaft and the rotational drive force transmitted to the first power transmission mechanism from the second shaft by way of the first one-way clutch portion are combined by the planetary gear mechanism and a product of the rotational drive forces is transmitted to the drive wheel by way of the drive shaft in a state where a rotational speed is increased,
    when the second shaft is rotated in the reverse direction by driving both the first rotary electric machine and the second rotary electric machine, the rotational drive force transmitted to the planetary gear mechanism from the first shaft and the rotational drive force transmitted to the second power transmission mechanism from the second shaft by way of the second one-way clutch portion are combined by the drive shaft and a product of the rotational drive forces is transmitted to the drive wheel in a state where a torque is increased, the first rotary electric machine and the second rotary electric machine are arranged parallel to each other in the longitudinal direction of a vehicle such that an axis (Ax2) of a second rotor which constitutes the second rotary electric machine is positioned in front of an axis (Ax1) of a first rotor which constitutes the first rotary electric machine along the vehicle body, and the first power transmission mechanism and the second power transmission mechanism are arranged inside the first rotary electric machine and the second rotary electric machine in the vehicle widthwise direction.

2. The electrically-operated two-wheeled vehicle according to claim 1, wherein the first one-way clutch portion and the second one-way clutch portion are mounted on the second shaft.

3. The electrically-operated two-wheeled vehicle according to claim 1, wherein the swing unit further comprises:

a clutch means which is arranged on a power transmitting path between the first one-way clutch portion and the planetary gear mechanism, and while allowing the transmission of the rotational drive force to the planetary gear mechanism from the second shaft, prevents the transmission of the rotational drive force to the second shaft from the planetary gear mechanism.

4. The electrically-operated two-wheeled vehicle according to claim 2, wherein the swing unit further comprises:

a clutch means which is arranged on a power transmitting path between the first one-way clutch portion and the planetary gear mechanism, and while allowing the transmission of the rotational drive force to the planetary gear mechanism from the second shaft, prevents the transmission of the rotational drive force to the second shaft from the planetary gear mechanism.

5. The electrically-operated two-wheeled vehicle according to claim 1, wherein the planetary gear mechanism comprises:

a sun gear which is connected to the first shaft;
a ring gear to which the rotational drive force of the first power transmission mechanism is transmitted;
planetary gears which are meshed with the sun gear and the ring gear respectively; and
a carrier which pivotally supports the planetary gears in a state where the carrier is connected to the drive shaft, and
the second power transmission mechanism is constituted of a chain or a belt which extends between and is wound around the second one-way clutch portion and the carrier.

6. The electrically-operated two-wheeled vehicle according to claim 2, wherein the planetary gear mechanism comprises:

a sun gear which is connected to the first shaft;
a ring gear to which the rotational drive force of the first power transmission mechanism is transmitted;
planetary gears which are meshed with the sun gear and the ring gear respectively; and
a carrier which pivotally supports the planetary gears in a state where the carrier is connected to the drive shaft, and
the second power transmission mechanism is constituted of a chain or a belt which extends between and is wound around the second one-way clutch portion and the carrier.

7. The electrically-operated two-wheeled vehicle according to claim 3, wherein the planetary gear mechanism comprises:

a sun gear which is connected to the first shaft;
a ring gear to which the rotational drive force of the first power transmission mechanism is transmitted;
planetary gears which are meshed with the sun gear and the ring gear respectively; and
a carrier which pivotally supports the planetary gears in a state where the carrier is connected to the drive shaft, and
the second power transmission mechanism is constituted of a chain or a belt which extends between and is wound around the second one-way clutch portion and the carrier.

8. The electrically-operated two-wheeled vehicle according to claim 4, wherein the planetary gear mechanism comprises:

a sun gear which is connected to the first shaft;
a ring gear to which the rotational drive force of the first power transmission mechanism is transmitted;
planetary gears which are meshed with the sun gear and the ring gear respectively; and
a carrier which pivotally supports the planetary gears in a state where the carrier is connected to the drive shaft, and
the second power transmission mechanism is constituted of a chain or a belt which extends between and is wound around the second one-way clutch portion and the carrier.

9. The electrically-operated two-wheeled vehicle according to claim 4, wherein a first sprocket, around which the second power transmission mechanism is wound, is mounted on the carrier, a second sprocket, around which the second power transmission mechanism is wound, is mounted on the second one-way clutch portion, and
the sun gear, the planetary gears and the ring gear are arranged between the first sprocket and the second sprocket.

10. The electrically-operated two-wheeled vehicle according to claim 8, wherein a first sprocket, around which the second power transmission mechanism is wound, is mounted on the carrier, a second sprocket, around which the second power transmission mechanism is wound, is mounted on the second one-way clutch portion, and
the sun gear, the planetary gears and the ring gear are arranged between the first sprocket and the second sprocket.

11. The electrically-operated two-wheeled vehicle according to claim 1, wherein the swing unit further comprises:

includes a centrifugal clutch which is positioned outside the first rotary electric machine in a vehicle widthwise direction, and connects and disconnects the first rotor and the first shaft corresponding to a rotational speed of the first rotor.

12. The electrically-operated two-wheeled vehicle according to claim 2, wherein the swing unit further comprises:

a centrifugal clutch which is positioned outside the first rotary electric machine in a vehicle widthwise direction, and connects and disconnects the first rotor and the first shaft corresponding to a rotational speed of the first rotor.

13. The electrically-operated two-wheeled vehicle according to claim 3, wherein the swing unit further comprises:

a centrifugal clutch which is positioned outside the first rotary electric machine in a vehicle widthwise direction, and connects and disconnects the first rotor and the first shaft corresponding to a rotational speed of the first rotor.

14. The electrically-operated two-wheeled vehicle according to claim 4, wherein the swing unit further comprises:
 a centrifugal clutch which is positioned outside the first rotary electric machine in a vehicle widthwise direction, and connects and disconnects the first rotor and the first shaft corresponding to a rotational speed of the first rotor.

15. The electrically-operated two-wheeled vehicle according to claim 5, wherein the swing unit further comprises:
 a centrifugal clutch which is positioned outside the first rotary electric machine in a vehicle widthwise direction, and connects and disconnects the first rotor and the first shaft corresponding to a rotational speed of the first rotor.

16. The electrically-operated two-wheeled vehicle according to claim 7, wherein the swing unit further comprises:
 a centrifugal clutch which is positioned outside the first rotary electric machine in a vehicle widthwise direction, and connects and disconnects the first rotor and the first shaft corresponding to a rotational speed of the first rotor.

17. A swing unit of an electrically-operated two-wheeled vehicle which pivotally supports a drive wheel in a state where the swing unit is mounted on a vehicle body, comprises:
 a first rotary electric machine which is capable of rotating a first shaft;
 a second rotary electric machine which is capable of rotating a second shaft in both normal and reverse directions;
 a planetary gear mechanism to which the first shaft is connected;
 a drive shaft which is connected to the planetary gear mechanism for rotatably driving the drive wheel;
 a first power transmission mechanism which transmits a rotational drive force of the second shaft to the planetary gear mechanism;
 a second power transmission mechanism which transmits the rotational drive force of the second shaft to the drive shaft;
 a first one-way clutch portion which allows transmission of the rotational drive force to the first power transmission mechanism from the second shaft only when the second shaft is rotated in the normal direction: and
 a second one-way clutch portion which allows transmission of a rotational drive force to the second power transmission mechanism from the second shaft only when the second shaft is rotated in the reverse direction,
 the swing unit transmits a rotational drive force of the first shaft to the drive wheel by way of the planetary gear mechanism and the drive shaft only when the first rotary electric machine is driven,
 when the second shaft is rotated in the normal direction by driving both the first rotary electric machine and the second rotary electric machine, the rotational drive force of the first shaft and the rotational drive force transmitted to the first power transmission mechanism from the second shaft by way of the first one-way clutch portion are combined by the planetary gear mechanism and a product of the rotational drive forces is transmitted to the drive wheel by way of the drive shaft in a state where a rotational speed is increased,
 when the second shaft is rotated in the reverse direction by driving both the first rotary electric machine and the second rotary electric machine, the rotational drive force transmitted to the planetary gear mechanism from the first shaft and the rotational drive force transmitted to the second power transmission mechanism from the second shaft by way of the second one-way clutch portion are combined by the drive shaft and a product of the rotational drive forces is transmitted to the drive wheel in a state where a torque is increased,
 the first rotary electric machine and the second rotary electric machine are arranged parallel to each other in the longitudinal direction of a vehicle such that an axis (Ax2) of a second rotor which constitutes the second rotary electric machine is positioned in front of an axis (Ax1) of a first rotor which constitutes the first rotary electric machine along the vehicle body, and
 the first power transmission mechanism and the second power transmission mechanism are arranged inside the first rotary electric machine and the second rotary electric machine in the vehicle widthwise direction.

18. The swing unit according to claim 17, wherein the first one-way clutch portion and the second one-way clutch portion are mounted on the second shaft.

19. The swing unit according to claim 17, wherein the swing unit further comprises:
 a clutch means which is arranged on a power transmitting path between the first one-way clutch portion and the planetary gear mechanism, and while allowing the transmission of the rotational drive force to the planetary gear mechanism from the second shaft, prevents the transmission of a rotational drive force to the second shaft from the planetary gear mechanism.

20. The swing unit according to claim 17, wherein the planetary gear mechanism comprises:
 a sun gear which is connected to the first shaft;
 a ring gear to which the rotational drive force of the first power transmission mechanism is transmitted;
 planetary gears which are meshed with the sun gear and the ring gear respectively; and
 a carrier which pivotally supports the planetary gears in a state where the carrier is connected to the drive shaft, and the second power transmission mechanism is constituted of a chain or a belt which extends between and is wound around the second one-way clutch portion and the carrier.

* * * * *